United States Patent

[11] 3,618,025

[72] Inventor Atsushi Tomozawa
Tokyo, Japan

[21] Appl. No. 859,056
[22] Filed Sept. 18, 1969
[45] Patented Nov. 2, 1971
[73] Assignee Nippon Electric Company, Limited
Tokyo, Japan
[32] Priority Sept. 20, 1968
[33] Japan
[31] 43/68498

[54] PULSE PHASE CONTROL APPARATUS FOR PULSE COMMUNICATIONS SYSTEMS
18 Claims, 4 Drawing Figs.

[52] U.S. Cl. .......... 340/170, 178/58, 325/21, 340/147 SY, 343/175
[51] Int. Cl. .......... H04q 9/00, H04l 5/14
[50] Field of Search .......... 340/147 SY, 170, 167 B; 325/21, 22, 58; 178/55, 57, 58, 66, 69.5, 69.5 DC; 343/175–180; 178/69

[56] References Cited
UNITED STATES PATENTS 3,453,592 7/1969 Yoshiteru Ishii et al. .......... 178/69.5 X
3,519,743 7/1970 Herter .......... 178/58

OTHER REFERENCES

IBM Technical Disclosure Bulletin Timing System for Data Transmission, G Schwartz, Vol. 6, No. 2, July 1963, pp. 77, 78. (copy in class 340/147 sync)

*Primary Examiner*—Donald J. Yusko
*Attorney*—Marn & Jangarathis

ABSTRACT: Pulse phase control apparatus for pulse communications systems including at least first and second stations is provided in accordance with the teachings of the present invention. According to the teachings of the present invention, the pulse phase control apparatus include a detector present in a first of such stations for detecting a condition thereat wherein pulses are transmitted from and received by the first station in time coincidence and an alarm circuit responsive to the detection of this condition for generating and transmitting a signal representative thereof to the second station. The second station includes a pulse transmitter for transmitting pulses to the first station which pulses have one of at least two predetermined phase relationships with pulses received at the second station and a variable phase circuit responsive to a received signal indicative of coincidence phase condition at the first station for changing the phase of the pulses transmitted from the second station from one predetermined phase relationship with respect to the pulses received at the second station to another. The pulse phase control apparatus according to the present invention thereby enables the simultaneous, bidirectional transmission of pulses between such at least first and second stations even though a common transmission path therebetween is relied upon.

INVENTOR.
Atsushi Tomozawa
BY
Marn & Jangarathis
ATTORNEYS

PULSE PHASE CONTROL APPARATUS FOR PULSE COMMUNICATIONS SYSTEMS

This invention relates to pulse phase control apparatus for pulse communications systems and more particularly to apparatus for enabling simultaneous communications to take place between two stations within such communications systems.

In conventional pulse communications systems such as those employing pulse code modulation (PCM) or pulse position modulation (PPM) techniques wherein a common carrier frequency is relied upon in a wireless mode of operation of a single pair of cables is utilized as the transmission path in a nonwireless mode or operation, it is generally impossible to transmit information from a first to a second station therein while information is being received at such first station from said second station. These conditions obtain because in conventional pulse communications systems which take this form, the single transmission path relied upon would cause information being transmitted from a given station therein to be received at the receiver portion of such given station wherever such given station was acting to receive information from other stations. Thus, in conventional pulse communications systems of the foregoing type it is necessary to terminate the transmission of information from a first to a second station therein whenever such first station is receiving information transmitted from said second station. This manner of operation has been denominated half-duplex operation to indicate that each transmission path residing between stations in conventional pulse communications systems of this type may transmit information in either direction so long as both directions are not utilized simultaneously.

As each station within half-duplex pulse communications systems include both receiving and transmitting portions, it will be seen that any mode of operation which requires the disabling of the transmitting portion of a station while a receiving portion thereof is in receipt of incoming information is highly inefficient and substantially increases the time required for a series of transmissions between two stations where the transmissions of said series originate at more than one station therein. However, despite the apparent disadvantages of conventional half-duplex pulse communications systems, no satisfactory mode of full-duplex operation, i.e. the simultaneous transmission of information in two directions, has been developed wherein only a single transmission path is relied upon and a common carrier frequency is used.

Therefore, it is an object of the present invention to provide pulse phase control apparatus for enabling simultaneous bidirectional transmissions to take place between stations in pulse communications systems.

It is a further object of the present invention to provide pulse phase control apparatus for use in pulse communications systems for controlling the phase relationship between pulses transmitted from and received by a given station therein so that full-duplex operation between stations in such pulse communications systems is available.

It is an additional object of the present invention to provide pulse phase control apparatus for controlling the phase relationship of pulses transmitted between stations in pulse communications systems so that selected phase relationships are maintained between pulses transmitted from and received by a given station therein even if the length of the transmission path through which said transmitted and received pulses propagate is varying.

Other objects and advantages of the invention will become clear from the following detailed description of an exemplary embodiment thereof, and the novel features will be particularly pointed out in conjunction with the appended claims.

In accordance with this invention, pulse phase control apparatus for pulse communications systems including at least two stations is provided wherein a first of said stations includes means for detecting any overlapping in the phase relationship between pulses received by said first station and means for generating and transmitting to a second station control signals representative of the overlapping phase relationship detected; and said second station of said at least two stations includes means for transmitting pulses to said first station having one of at least two predetermined phase relationships with respect to pulses received thereby and means responsive to the receipt of said control signals for changing the phase of said pluses transmitted to said first station from said one of at least two predetermined phase relationships to another of said at least two predetermined phase relationships whereby said overlapping in phase of the pulses received and transmitted by each of said at least two stations is avoided and simultaneous bidirectional communication therebetween may be obtained.

The invention will be more clearly understood by reference to the following detailed description of an embodiment thereof in conjunction with the accompanying drawings in which.

Figure 1:
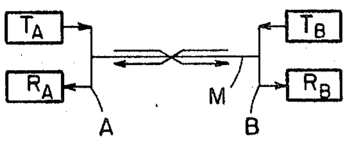
FIG. 1 is a block diagram of a communications system in which the present invention finds application.

Referring now to the drawings and more particularly to FIG. 1 thereof, there is shown a block diagram of a communications system in which the present invention finds application. The communications system depicted in FIG. 1 includes two stations and may be considered to comprise a pulse communications system which relies upon pulse code modulation (PCM), pulse position modulation (PPM) or similar pulse techniques. The illustrated communications system of FIG. 1 has been highly simplified as the precise details of the communications system forms no part of the present invention and because the instant invention finds application in any pulse communications system which conventionally operates according to a half-duplex mode of operation. The communication system shown in FIG. 1 comprises a first station indicated at reference point A and a second station indicated at reference point B. The first and second stations each include transmitter means $T_A$ and $T_B$, respectively, which may take any conventional form of this class of devices that act in the well-known manner to modulate an information signal according to the pulse technique relied upon and to transmit the thus modulated information signal through a suitable transmission path to another station within the illustrated communications system. Similarly, the first and second stations present in the communications system illustrated in FIG. 1 each include receiver means $R_A$ and $R_B$, respectively. The receiver means $R_A$ and $R_B$ also may take any conventional form of these devices which act in the well known manner to demodulate a pulse-modulated information signal received thereby and to thus recover therefrom the original information signal transmitted by the transmitter means $T_A$ and $T_B$. The transmitter and receiver means $T_A$ and $R_A$ present in the first station located at reference point A are illustrated as being connected in parallel to a first end of the transmission path M indicated in FIG. 1 while the transmitter and receiver means $T_B$ and $R_B$, as present in the second station located at reference point B, are illustrated as being connected in parallel to a second end portion of the transmission path M. The transmission path M may take the form of any conventional half-duplex transmission medium such as a single carrier frequency radiating through space in the case of a wireless communications system, or a single pair of cables in the case of a wire communications system.

In the operation of the communications system illustrated in FIG. 1, it will be appreciated that if a half-duplex mode of operation is relied upon, information signals may be transmitted in the well-known manner from reference point A to reference point B in the form of a pulse train by disabling transmitter means $T_B$ and receiver means $R_A$ while transmitter means $T_A$ and receiver means $R_B$ are operational. Conversely, information signals may be transmitted as a pulse train from the second station at reference point B to the first station at reference point A by disabling transmitter means $T_A$ and receiver means $R_B$ while the transmitter means $T_B$ and the receiver means $R_A$ are operative. Thus, it will be seen that in the communication system illustrated in FIG. 1, transmissions originating at the first station located at reference point A may be transmitted through the transmission path M to the second station located at reference point B or transmissions originating at the second station located at reference point B may be transmitted through the transmission path M to the first station located at reference point A. However, if transmission should be simultaneously initiated at each of the first and second stations by transmitter means $T_A$ and $T_B$, the receiver means $R_A$ will not only receive the pulse train transmitted through the transmission path M by the transmitter means $T_B$, but will also receive the pulse train transmitted by the transmitter means $T_A$ located at the same station. Similarly, under these conditions, the receiver means $R_B$ will not only receive the pulse train transmitted through the transmission path M by the transmitter means $T_A$ but also receives the pulse train transmitted by the transmitter means $T_B$ located at the same station. Therefore, as the pulse trains transmitted by the transmitter means $T_A$ and $T_B$ are modulated by the same carrier frequency, or are adapted for transmission in the same pair of cables in a half-duplex transmission system, the pulses received at receiver means $R_A$ or $R_B$ will not be distinguishable as to the source thereof except with regard to their phase. Thus, in order to avoid the distorting effects of the reception of extraneous pulse modulated signals, conventional communications systems judiciously avoid simultaneous, bidirectional transmissions in half-duplex transmission paths.

As each of the transmitter means $T_A$ and $T_B$ shown in FIG. 1 produce pulse trains characterized by a plurality of pulses having discrete spacing or pause times therebetween, full-duplex operation or simultaneous transmission in each direction is feasible so long as the conditions imposed at both the receiver means $R_A$ and $R_B$ is such that pulses are received from one of the transmitter means $T_A$ or $T_B$ only during the pause time of the pulses received from the other one of the transmitter means $T_B$ or $T_A$. Thus, under these conditions, the pulses received at a single receiver means $R_A$ and $R_B$ may be readily distinguished as between those originating from the transmitter means $T_A$ and those originating from the transmitter means $T_B$ so long as they are received in an interleaved manner having a known phase relationship and do not overlap at the receiving point. Furthermore, as shall become apparent below, if the width of each pulse transmitted is maintained below a selected value, there will be a selectable phase relationship available between pulses received at each receiver means $R_A$ and $R_B$ from both the transmitter means $T_A$ and $T_B$ so that no overlap occurs regardless of the distance between stations. The phase relationship between pulses received at the receiver means $R_A$ and $R_B$ when both the transmitter means $T_A$ and $T_B$ are transmitting is further described in conjunction with FIG. 2.

Figure 2:
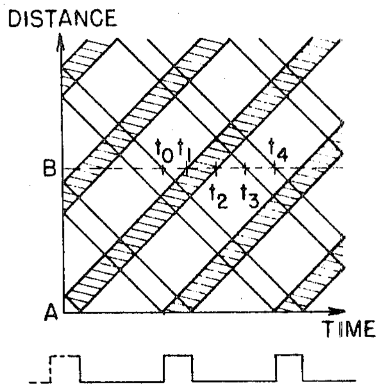
FIG. 2 is a graphical representation illustrating the phase relationship between pulses transmitted from and received by two stations within a pulse communications system.

FIG. 2 is a graphical representation illustrating the phase relationship between pulses transmitted from and received by two stations within a communications system. More particularly, FIG. 2 is a time-space plot of the phase relationship between pulses transmitted from a first station to a second station and from a second station to a first station wherein the abscissa of the graphical representation of FIG. 2 represents time while the ordinate thereof represents distance. Furthermore, in FIG. 2 the point on the ordinate annotated A, which is coincident with the intersection of the abscissa, is indicative of the position of the first station shown in FIG. 1 and located at reference point A while the point on the ordinate annotated B, intersecting the dashed line parallel to the abscissa, is indicative of the position of the second station shown in FIG. 1 located at reference point B. In FIG. 2, pulses transmitted from the first station shown in FIG. 1 at reference point A to the second station located at reference point B are shown by each pair of hatched parallel lines while pulses transmitted from the second station shown in FIG. 1 at reference point B to the first station located at reference point A are indicated by each pair of narrow parallel lines sloping downward to the right. As may be appreciated from an inspection of FIG. 2, the graphical representation therein illustrates the worst condition for the reception of pulses at the first station of the communications system of FIG. 1 located at reference point A because each pulse transmitted from the second station located at reference point B, as indicated by the pairs of narrow parallel lines sloping downward, is received at the first station located at reference point A at the same instant of time that pulses are transmitted therefrom toward the second station. Accordingly, it will be appreciated, as indicated by the triangular intersections of each pair of downward sloping parallel lines and upward sloping pair of hatched lines at reference point A, that in the case illustrated in FIG. 2 for the first station located at reference point A, the receiver means $R_A$ will receive pulses transmitted from the transmitter means $T_B$ and the transmitter means $T_A$, present in the first and second stations, respectively, of the pulse communications system shown in FIG. 1 in an overlapped or coincident phase relationship and hence will be unable to distinguish therebetween whereby distorted information is received.

In contradistinction to the worst case of reception illustrated in FIG. 2 for the first station located at reference point A in FIG. 1, the reception at the second station located at reference point B is quite good because the pulses transmitted from the first station to the second station are received at reference point B in a completely displaced phase relationship with the pulses transmitted from the second station located at reference point B. Thus, as shown in FIG. 2, pulses transmitted from the first station located at reference point A toward the second station located at reference point B are received during the time interval between $t_1$ and $t_2$ while pulses transmitted from the second station toward the first station located at reference point A are transmitted from point B during the time interval between $t_3$ and $t_4$. Accordingly, it will be seen that pulses transmitted from the transmitter means $T_A$ will be received at the receiver means $R_B$ during the time interval $t_1$–$t_2$ while pulses transmitted from the transmitter means $T_B$ will be received at the receiver means $R_B$ during the time interval $t_3$–$t_4$. Therefore, due to the foregoing phase displacement, the receiver means $R_B$ is clearly able to distinguish between the pulses transmitted thereto and those being transmitted by the station within which it resides.

As the graphical representation of FIG. 2 depicts the worst case of reception at the first station located at reference point A, while the reception at the second station located at point B clearly allows for the discrimination of pulses transmitted thereto from the first station from those transmitted therefrom; it will be appreciated that if the phase of the pulses transmitted from the second station toward the first station is shifted from the interval $t_3$–$t_4$ and the interval $t_1$–$t_2$ is avoided so that no phase overlap takes place at reference point B, the pulses transmitted to receiver means $R_A$ and $R_b$ will be clearly distinguishable from the pulses transmitted by the station in which it resides. Thus, if the phase of the pulses transmitted from the second station at reference point B were shifted so as to be transmitted during the interval $t_0$–$t_1$ or $t_2$–$t_3$, the pulses transmitted toward the receiver means $R_B$ from the transmitter means $T_A$ would still be received in a nonoverlapping relationship with the pulses received by the receiver means $R_B$ from the transmitter means $T_B$ and hence readily distinguishable thereby, while pulses transmitted toward the receiver means $R_A$ from the transmitter means $T_B$ would also be received by said receiver means $R_A$ in a nonoverlapping relationship with the pulses received by the receiver means $R_A$ from the transmitter means $T_A$ and accordingly readily distinguishable. Therefore, when these conditions obtain in the pulse communications system illustrated in FIG. 1, full-duplex transmission will be enabled even though the transmission path M present therein is conventionally regarded as only capable of half-duplex operation.

In FIG. 2, it will be seen that the transmission and reception pulse widths, i.e. the width occupied by each pair of narrow, parallel sloping lines, of each pulse transmitted and received has been illustrated as equal and the band areas shown at reference point B, as defined by the time intervals $t_0$–$t_1$ and $t_2$–$t_3$, are depicted as similar in duration to the widths defined by the time intervals $t_1$–$t_2$ and $t_3$–$t_4$. This has been done in FIG. 2 to simplify the time-space plot presented; however, it will be clearly understood that the pulse widths of the pulses transmitted and received may be varied to any appropriate width so that the spacing therebetween at reference points A and B is accordingly increased. In addition, the repetition rate of the pulses transmitted from the first and second stations located at referenced points A and B may be varied so as to further increase the band areas defined by the time intervals $t_0$–$t_1$ and $t_3$. Practically, in order to ensure that no overlapping occurs at either reference points A or B, between the pulses transmitted from and received at such reference points, when a full-duplex mode of operation is practiced according to the teachings of the present invention it is necessary to arrange the width of the band defined by the time intervals $t_0$–$t_1$ and $t_2$–$t_3$ to be wider than the sum of the transmission and reception pulse widths, or if the operation of the receiver means $R_A$ and $R_B$ so require, to be wider than the sum of the transmission and reception pulse widths by an additional time interval. Furthermore, to allow bidirectional communication to be accomplished in accordance with the teachings of the present invention, regardless of the distance between the reference points A and B or in cases where the distance between reference points A and B is varying; there must be a time interval available on the time axis corresponding to reference point B on the time-space plane, which time interval is not occupied by either band area defined by the transmission and reception pulses. This condition may be readily established, as may be seen from FIG. 2, by limiting the pulse width band areas of the pulses transmitted and received to less than half the pulse repetition period.

Figure 3:
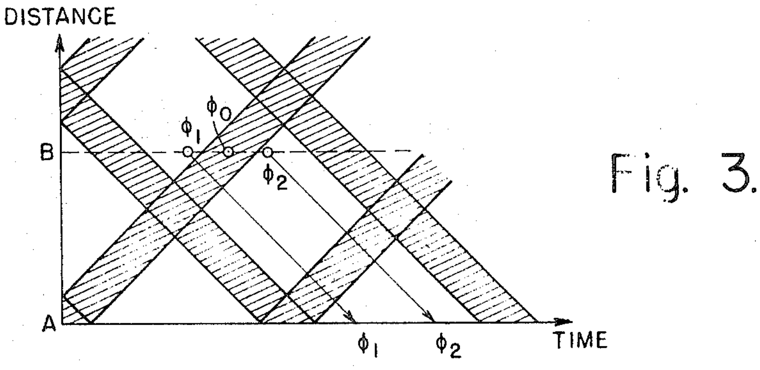
FIG. 3 is a graphical representation of the phase relationship of pulses transmitted from sand received by two stations in a pulse communications system and serves to illustrate the principles underlying the present invention.

The principles underlying the mode of operation of the pulse phase control apparatus according to the present invention are further explained in conjunction with FIG. 3. FIG. 3 is a graphical representation of the phase relationship of pulses transmitted and received by two stations in a communications system and more particularly, FIG. 3 is an enlarged portion of the time-space plot shown in FIG. 2 appropriately annotated so that selected phase displacements $\Phi_1$ and $\Phi_2$ are shown thereon. In FIG. 3, the pairs of narrow parallel lines indicating pulses transmitted from reference point A and reference point B have each been hatched; however, the pairs of parallel lines sloping upward to the right still indicate pulses transmitted from the first station located at reference point A to the second station located at reference point B while the pairs of parallel lines sloping downward to the right indicate pulses transmitted from the second station located at reference point B to the first station located at reference point A. As will be seen from an inspection of FIG. 3, a pulse transmitted from the first station located at reference point A will be received at the second station located at reference point B having a reference phase $\Phi_0$. Therefore, as long as the pulse widths of the pulses transmitted and received by the first and second stations meet the conditions for simultaneous communication set forth above, first and and second phases $\Phi_1$ and $\Phi_2$ may be selected for the transmission phase of pulses transmitted from the second station located at reference point B which first and second phases $\Phi_1$ and $\Phi_2$ ensure that, under the conditions illustrated in FIG. 3, no overlap will occur at reference points A or B so long as the phase of pluses received at reference point B is $\Phi_0$ and pulses are transmitted from reference point B at lead phase $\Phi_1$ or lag phase $\Phi_2$. In FIG. 3, the first and second phases $\Phi_1$ and $\Phi_2$ illustrated have been selected at the minimum time interval from the reference phase $\Phi_0$ so as to allow for simultaneous communication. Thus, as illustrated in FIG. 3, if pulses are transmitted from the reference point B having a controlled phase of $\Phi_1$ or $\Phi_2$ with respect to the reference phase $\Phi_0$ of pulses received at point B, the pulses received at reference point A will not overlap or arrive in time coincidence with the pulses transmitted therefrom so long as the conditions illustrated in FIG. 3 remain constant and the requirements for simultaneous transmission in both directions, as outlined above, are maintained. Furthermore, even if the conditions illustrated in FIG. 3 do not remain constant, one of the transmission phases $\Phi_1$ or $\Phi_2$ shown in FIG. 3 will still produce the requisite reception condition at reference point A while appropriate transmission conditions are maintained at reference point B. Thus, even if an overlap condition should occur at reference point A between pulses transmitted therefrom and received pulses transmitted from reference point B having a transmission phase equal to $\Phi_1$ or $\Phi_2$; it will be seen that the overlapped condition can be remedied by changing the transmission phase of pulses transmitted from reference point B to the other transmission phase $\Phi_2$ or $\Phi_1$, respectively.

Figure 4:
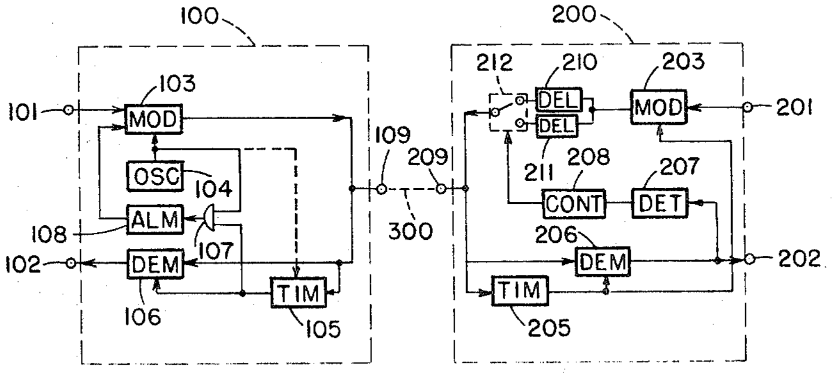
FIG. 4 is a block diagram schematically illustrating an exemplary embodiment of the present invention.

Referring to FIG. 4 there is shown a block diagram which serves to schematically illustrate an exemplary embodiment of the present invention and more particularly a simplified pulse communications system which includes an embodiment of the pulse phase control apparatus of the present invention. The pulse communications system illustrated in FIG. 4 comprises a main station 100 and an auxiliary station 200 interconnected by the transmission path 300. The main station 100 includes input terminal means 101, pulse modulation circuit means 103, oscillator means 104, timing circuit means 105, demodulator means 106, alarm circuit means 108 and the output terminal means 102. The input terminal means 101 is adapted in the well-known manner to receive input signals to be modulated and thereafter transmitted from the main station 100. The input terminal means 101 is connected to a first input to the pulse modulation circuit means 103. The pulse modulation circuit means 103 may take any conventional from of pulse transmission means which acts in the well-known manner to pulse modulate input signals applied at either first or second inputs thereto according to a selected modulation scheme and to transmit the information pulses derived therefrom. The pulse modulation circuit means 103 is controlled, in the well-known manner by clock pulses applied to a timing input thereof. A second input of the pulse modulation circuit means 103 is connected to the alarm circuit means 108 while the timing input thereof is connected to the oscillator means 104. The output of the pulse modulation circuit means 103 is connected to terminal means 109 which acts, as shall be seen below, as both a transmission and reception point. Thus, the input terminal means 101, the pulse modulation circuit means 103 and the oscillator means 104 form the transmission portion of the main station 100.

The oscillator means 104 may take the form of conventional clock pulse generator means which acts in the well-known manner to produce timing pulses at a predetermined repetition rate. The output of the oscillator means 104 is connected to the timing input of the pulse modulation circuit means 103, as aforesaid, and is additionally connected as indicated in FIG. 4 to a first input of AND gate means 107. The AND gate means 107 may take any well-known form of this conventional class of devices which acts to produce an output pulse only in response to the coincident application of first and second input signals to the first and second inputs thereof. The second input to the AND gate means 107 is connected to the output of the timing circuit means 105, described below, while the output of the AND gate means 107 is connected to the alarm circuit means 108. The alarm circuit means 108 may take any conventional from of pulse-generator means which acts to generate a distinctive pulse sequence or tone burst in response to an input signal applied thereto by the AND gate means 107. Although the function of the alarm circuit means 108 will be rendered apparent below in conjunction with a description of the operation of FIG. 4, it should here be noted that the distinctive pulse sequence or tone burst generated thereby should be readily distinguishable from the regular information signals applied to input terminal means 101 and hence, if it should be assumed that the input signals applied to input terminal means 101 are representative of speech signals for example, the frequency of the pulses produced by the alarm circuit means 108 should reside outside of the bandwidth normally occupied by such speech signals. The output of the alarm circuit means 108 is connected, as aforesaid, to the second input of the pulse modulation circuit means 103.

The timing circuit means 105 is connected as shown in FIG. 4 to the terminal means 109 which acts as a reception point with respect thereto. The timing circuit means 105 takes the form of a conventional pulse generator means which acts in response to the timing information contained in a pulse train received at the reception point 109, to generate timing or clock pulses for controlling the operation of the demodulator means 106. The timing circuit means 105 may be either internally driven or externally driven as here indicated by the dashed connection to the oscillator means 104. The output of the timing circuit means 105 is connected to a timing input of the demodulator means 106. The demodulator means 106 may take any of the conventional forms of demodulator devices generally present in known receivers which act in the well-known manner to demodulate pulse-modulated input pulses at a rate determined by the timing pulses applied thereto and thus derive from such modulated input pulses the information signal originally transmitted. The input to the demodulator means 106 is connected, as indicated in FIG. 4, to the terminal means 109 which should here be considered as a reception point while the output of the demodulator means 106 is coupled to the output terminal means 102. Thus, the demodulator means 106 and the timing circuit means 105 form the receiver portion of the main station 100.

The auxiliary station 200 includes input terminal means 201, pulse modulation circuit means 203, timing circuit means 205, demodulator means 206, detector means 207, switch means 212 and output terminal means 202. The input terminal means 201 is adapted to receive information signals to be transmitted and is connected, as shown in FIG. 4, to a first input of the pulse modulation circuit means 203. The pulse modulation circuit means 203 may take the same form as the pulse modulation circuit means l03 present in the main station 100; however, such circuit means 203 is here shown as provided with only a first information input which is connected to input terminal means 203. The timing input of the pulse modulation circuit means 203 is connected to the timing circuit means 205 while the output thereof is connected to each of the delay means 210 and 211. The delay means 210 and 211 may each take any well-known form of delay circuit means, such as a delay line, which acts in the well-known manner to insert a predetermined time delay in the phase of pulses applied thereto. For the purposes of equating the apparatus illustrated in FIG. 4 with the graphical representation of FIG. 3, the delay means 210 may be considered as inserting a time delay into pulses applied thereto such that the $\Phi_2$ phase lag with respect to $\Phi_0$ is obtained while the delay means 211 may be considered as inserting a time delay into pulses applied thereto such that the $\Phi_1$ phase lead with respect to $\Phi_0$ of the next pulse received is obtained. The output of the delay means 210 is connected to a first input of the switch means 212 and the output of the delay means 211 is connected to a second input of said switch means 212. The switch means 212 depicted in FIG. 4 as comprising mechanical single pole double-throw switch contacts so that its function is rendered apparent; however, as shall be obvious to those of ordinary skill in the art the switch means 212 will preferably comprise electronic switch means capable of external control. The output of the switch means 212 is connected, as indicated in FIG. 4, to the terminal means 209 which acts as both a transmission and reception point for the auxiliary station 200. A control means 208 is also connected to a control input of the switch means 212. The control means 208 may take any conventional from of circuit which acts in response to the receipt of an input signal to thereby change the condition of the switch means 212 from a first to a second condition or from a second to a first condition depending upon the initial state of said switch means 212. The precise form which the control means 208 takes will of course be substantially dependent on the nature of the switch means 212. Thus, it will be seen that the pulse modulation means 203, the delay means 210 and 211, the switch means 212 and the terminal means 209 form the transmission portion of the auxiliary station 200.

The terminal means 209 is also connected as shown in FIG. 4 to the inputs of the timing circuit means 205 and the demodulator means 206. The timing circuit means 205 may take the same form as the timing circuit means 105 present in the main station 100 and thus acts in the well-known manner in response to the timing information contained in the pulse train applied thereto to generate timing or clock pulses therefrom and produce such timing pulses at the output thereof. The output of the timing circuit means 205 is connected, as shown in FIG. 4, to the timing inputs of both the demodulator means 206 and the pulse modulation circuit means 203 so that said timing circuit means effectively acts as a common source of timing information therefor. The demodulator means 206 may take the same form as the demodulator means 106 described above in conjunction with the main station 100 and accordingly, acts in the well-known manner, to derive the information signals present in the pulse-modulated input pulses applied thereto at a rate determined by the timing signals received thereby and provides such information signals at the output thereof. The output of the demodulator means 206 is connected to the output terminal means 202 whereat information signals transmitted to the auxiliary station 200 are made available for further utilization. In addition, the output of the demodulator means 206 is connected to the input of the detector means 207. The detector means 207 may take any conventional form of detector circuit capable of detecting the presence in the output of the demodulator means 206 of the distinctive pulse sequence or tone burst generated by the alarm circuit means 108 and producing an output in response thereto. The output of the detector means 207 is connected to the input of the control circuit 208 which acts in the previously described manner to control the condition of the switch means 212. Thus, it will be seen that the demodulator means 206 and the output terminal means 212 act as the receiver portion of the auxiliary station 200 while both the pulse modulation circuit means 203 and the demodulator means 206 are commonly timed by the timing circuit means 205.

The main station 100 and the auxiliary station 200 are interconnected at their respective terminals 109 and 209 by the transmission path 300. The transmission path 300 may take the form of any transmission medium which is conventionally regarded as a half-duplex medium. Thus, if a wireless pulse communication system is considered as illustrated in FIG. 4, the transmission path 300 would comprise a single carrier frequency propagating through space.

In the operation of the simplified pulse communications system illustrated in FIG. 4, which serves, as aforesaid, to illustrate the pulse phase control apparatus according to the present invention; it may be initially assumed that information signals to be transmitted from the main station 100 to the auxiliary station 200 are applied to the input terminal means 101 of said main station 100 and that information signals to be transmitted from the auxiliary station 200 to the main station 100 are applied to the input terminal means 201 of said auxiliary station 200. The information signals applied to the input terminal means 101 of the main station 100 are further applied by the conductor illustrated to the first input of the pulse modulation circuit means 103. At the same time, the oscillator means 104 will be actuated to thereby apply clock pulses to the timing input of the pulse modulation circuit means 103 whereupon the information signals applied to the first input thereof will, in the well-known manner, be pulse modulated and applied to the terminal means 109 as a series of discrete pulses having predetermined time intervals therebetween. In addition, the clock pulses produced by the oscillator means 104 are applied to the first input of the AND gate means 107; however, as no other input signal is here received at the second input of the AND gate means 107, no output signal is produced thereby.

Each pulse received at the terminal means 109, which here acts as a transmission point, is transmitted through the transmission path 300 to the terminal means 209 of the auxiliary station 200. The transmitted pulses which are received at the terminal means 209 are applied through the conductors illustrated in FIG. 4 to the input of both the demodulator means 206 and the timing circuit means 205. The timing circuit means 205 upon receipt of an incoming pulse train acts in the well-known manner in response to the timing information contained therein to generate clocking or timing pulses at the output thereof. The clock pulses produced by the timing circuit means 205 are applied to the timing input of the demodulator means 206 to control the action thereof. The demodulator means 206, thus in receipt of modulated pulses at the fist input thereto and the clock pulses at the timing input thereof, acts to demodulate each modulated pulse received thereby under the control of the timing circuit means 205 and hence only demodulates those pulses applied thereto when said demodulator means 206 is in receipt of clock pulses from said timing circuit means 205. The information signal is thus derived in the well-known manner from the demodulation of the pulses applied to the first input of said demodulator means 206 and is applied to both the output terminal means 202 and the detector means 207. The information signal applied to the output terminal means 202, which here acts as the output of the auxiliary station 200, may be applied to conventional utilization circuitry, not shown herein, in the well-known manner. The information signals applied to the input of the detector means 207 will cause no output to be produced therefrom because, under the conditions stated above, no tone burst or distinctive pulse sequence, as generated by the alarm circuit means 108 has here been produced.

Each clock pulse produced by the timing circuit means 205, which for the purposes of reconciling the operation of FIG. 4 with the graph of FIG. 3 should be considered as being produced at $\Phi_0$, is applied to the timing input of the pulse modulator circuit means 203 as well as to the timing input of the demodulation means 206. As the clock pulses applied to the pulse modulation circuit means 203 controls the operation thereof, the information signals applied to the input terminal means 201 and hence to the first input of the pulse modulation circuit means 203, will, in the well-known manner, be pulse modulated and produced at the output of the pulse modulation circuit means 203 as a plurality of discrete pulses having predetermined time intervals therebetween. Each pulse thus produced by the pulse modulation circuit means 203 is applied by the switch means 212 to the terminal means 209 which here acts as a transmission point. Furthermore, depending upon the state of the switch means 212, each pulse produced by the pulse modulation circuit means 203 will be applied to the terminal means 209 through the delay means 210 or 211 and hence will have a time delay inserted therein such that the phase thereof will be equal to either $\Phi_2$ or $\Phi_1$, respectively, with respect to the $\Phi_0$ phase of the clock pulses produced by the timing means 205. Thus it will be seen that at the auxiliary station 200, the pulses transmitted from the terminal means 209 will have a phase $\Phi_2$ or $\Phi_1$ with respect to the phase $\Phi_0$ of pulses received thereby, depending on the state of the switch means 212.

The pulses applied to the terminal means 209 through the switch means 212 are transmitted through the transmission path 300 and are thus received at the terminal means 109 of the main station 100. As the timing circuit means 105 and the demodulator means 106 are each connected to the terminal means 109, which here acts as a reception point, the timing circuit means 105 will, in the well-known manner, derive the timing information from the pulses received thereby and produce clock pulses in response thereto while the demodulator means 106 has each pulse received at the terminal means 109 applied to the first input thereof. The clock pulses produced by the timing means 105 are applied from the output thereof to the timing input of the demodulator means 106 to thereby control the operation of said demodulator means 106 and in addition, such clock pulses are applied to the second input of the AND gate means !07. Accordingly, the demodulator means 106 acts in the well-known manner, under the control of the timing means 105, to demodulate each of the pulses received thereby and to apply the information signal derived therefrom to the output terminal means 102. Thus, it will be seen that information signals applied to the input terminal 101 may be transmitted to the auxiliary station 200 and that information signals applied to the input terminal means 201 may be transmitted to the main station 100 in a bidirectional manner because one of two preselected phase differences is inserted in pulses transmitted from the auxiliary station 200 which preselected phase differences are each calculated to avoid overlap between the pulses received by and transmitted from the main station 100 in the manner described in conjunction with FIG. 3.

Furthermore, as one of the preselected phase delays $\Phi_1$ or $\Phi_2$ will always avoid an overlapped condition between the pulses received by and transmitted from the main station 100, a monitoring operation is continuously carried out at said main station 100 to ensure that such overlapped condition does not occur due to a possible change in the conditions under which transmission and reception are occurring. The monitoring operation which takes place in the main station 100 is carried out by the AND gate means 107, which receives, as aforesaid, a first input from the oscillator means 104 and a second input from the timing circuit means 105 and acts in the well-known manner to produce an output signal only when first and second input signals are applied thereto in coincidence. As the oscillator means 104 controls the operation of the pulse modulation circuit means 103 while the timing circuit means 105 controls the operation of the demodulator means 106, it will be appreciated that the occurrence of an output from the oscillator means 104 and the timing circuit means 105 in time coincidence will indicate that pulses are being transmitted from and received at the terminal means 109 in time coincidence and hence an overlapped condition between the pulses transmitted from and received by the main station 100 obtains. However, when the first and second inputs to the And gate means 107, as applied by the oscillator means 104 and the timing circuit means 105, are received in coincidence, the And gate means 107, will, in the well-known manner, produce an output signal which is applied to the alarm circuit means 108. The alarm circuit means 108 acts, as aforesaid, in response to a signal applied thereto by the AND gate means 107 to produce a tone burst or an otherwise distinctive pulse sequence which resides substantially outside of the frequency bandwidth of the information signals applied to the first input of the pulse modulation circuit means 103. The output of the alarm circuit means 108 is applied to the second input of the pulse modulation circuit means 103, so that, upon the detection of an overlap condition by the AND gate means 107, the tone burst or other distinctive pulse sequence produced by the alarm circuit means 108 is applied to the second input of the pulse modulation circuit means 103 and is pulse modulated thereby with the information signal applied to the first input thereof in the well-known manner. Thus, under these conditions, the pulse output of the pulse modulation circuit means 103 is representative of AND pulse modulated composite signal formed by the information signal applied to the first input of the pulse modulation circuit means 103 AND the tone burst or other distinctive pulse sequence applied to the second input of said pulse modulation circuit means 103. The output of the pulse modulation circuit means 103 is applied to the transmitted means 109 where each pulse therein is transmited through the transmission medium 300 and received by the auxiliary station 200 at the terminal means 209. Each pulse received at the terminal means 209 is applied to the input of the demodulator means 206 where such pulse is demodulated, under the control of timing circuit means 205 in the manner set forth above, and the composite signal is derived therefrom and produced at the output of said demodulator means 206. As the composite signal which was here initially modulated contained both an information signal and a tone burst or other distinctive pulse sequence which resides substantially outside of the bandwidth of the information signal, the tone burst or other distinctive pulse sequence present in the composite signal produced at the output of the demodulator means 206 may be readily separated from the information signal component present therein and detected by the detector means 207 while the information signal is applied to the output terminal means 202 as aforesaid,. Upon the detection of the tone burst or other distinctive signal sequence, the detector means 207 will produce an output signal which is applied to the input of the control circuit means 208. The control circuit means 208, as aforesaid, responds to the output of the detector means 207 to change the condition of the switch means 212 whereupon the delay means 210 or 211, through which the output of the pulse modulation circuit means 203 is applied to the terminal means 209, is changed and thus the phase of the pulses transmitted from the auxiliary station 200 is changed from one to another of the predetermined phases $\Phi_1$ or $\Phi_2$ selected. Accordingly, as the overlap condition at the main station 100 can not persist at both of the phases $\Phi_1$ and $\Phi_2$, as explained in conjunction with FIG. 3, the overlapped condition detected will be corrected for the pulse transmitted from the auxiliary station 200 subsequent to the change in the condition of the switch means 212 to thereby reestablish the requisite phase relationship for the simultaneous bidirectional transmission between the main station 100 and the auxiliary station 200. Thus, it is seen that the pulse phase control apparatus according to the present invention enable simultaneous, bidirectional transmission between stations in pulse communications systems by automatically controlling the phase of the pulses transmitted and received even if the distance through which the transmission takes place is varied.

Although the present invention has been disclosed in conjunction with the rather simplified pulse communications system illustrated in FIG. 4, it will be appreciated by those of ordinary skill in the art, that the pulse phase control apparatus according to the instant invention may be relied upon in any pulse communications systems previously considered as limited to half-duplex operation. Therefore, it will be manifest that the present invention is not intended to be limited to any of the exemplary circuit means described herein or illustrated in FIG. 4.

What is claimed

1. Pulse phase control apparatus for communications systems including at least first and second stations wherein pulses are transmitted between each of said stations and each pulse transmitted by one of said stations is received at the other of said stations via a common transmission path, said pulse phase control apparatus comprising:

means present in said first station for detecting any coincident relationship in phase between pulses transmitted from said first station and pulses received thereby;

means responsive to the detection of a coincident relationship in phase between pulses transmitting from said first station and pulses received thereby for generating and transmitting to said second station via said common transmission path control signals indicative of the condition detected, said means for generating and transmitting said control signals being operatively connected to said detecting means and relationships in said first station;

means preset in said second station for inserting one of at least two time delays in pulses transmitted to said first station from said second station via said common transmission path so that pulses transmitted from said second station have one of at least two preselected phase relationshiops with the pulses received thereby; and detector means present in said second station for detecting the receipt of said control signals and upon the detection of said control signals for changing the time delay inserted in pulses transmitted from said second station so that said last named pulses exhibit another of said at least two preselected phase relationships with pulses received at said second station.

2. The pulse phase control apparatus according to claim 1 wherein pulses transmitted from said first station to said second station via said common transmission path are transmitted under the control of first timing signals and pulses received at said first station are demodulated under the control of second timing signals, said pulse phase control apparatus additionally comprising means for applying said first and second timing signals to said means for detecting said coincident relationship in phase as individual inputs thereto.

3. The pulse phase control apparatus according to claim 2 wherein said means for detecting said coincident relationship in phase between pulses transmitted from said first station and pulses received thereby comprises coincidence circuit means responsive to the coincident application of said first and second timing signals thereto to produce an output signal representative of said coincident relationship.

4. The pulse phase control apparatus according to claim 3 wherein said coincidence circuit means comprises AND gate means.

5. The pulse phase control apparatus according to claim 3 wherein said means responsive to the detection of a coincident relationship in phase between pulses transmitted from said first station and pulses received thereby for generating and transmitting to said second station control signals indicative of the condition detected includes signal generator means, said signal generator means being operatively connected to an output of said coincident circuit means and responsive thereto to produce said control signal upon the coincident application of said first and second timing signals to said coincident circuit means.

6. The pulse phase control apparatus according to claim 5, wherein pulses transmitted from said second station to said first station via said common transmission path are transmitted under the control of third timing signal and pulses received at said second station are demodulated under the control of said third timing signals.

7. The pulse phase control apparatus according to claim 6 wherein said means present in said second station for inserting one of at least two time delays in pulses transmitted to said first station via said common transmission path includes first and second delay means and switch means for selectively deriving from said first and second delay means the pulses transmitted to said first station from said second station via said common transmission path.

8. The pulse phase control apparatus according to claim 7 wherein said detector means present in said second station includes means for detecting the presence of said control signal and means responsive to the detection of said control signal for changing the condition of said switch means to thereby change the delay inserted in pulses transmitted from said second station.

9. The pulse phase control apparatus according to claim 8 wherein said coincident circuit means comprises AND gate means.

10. In a pulse communications system including at least first and second stations wherein each station includes modulator means for transmitting pulses to the other of said stations via a common transmission path and demodulator means for demodulating pulses received at said station, the improvement comprising:

means present in said first station for detecting any coincident phase relationship between pulses transmitted from said first station and pulses received thereby;

control means responsive to the detection of said coincident phase relationship by said detecting means for generating a control signal for transmission to said second station via said common transmission path, said control means being operatively connected to an output of said detecting means;

means for inserting one of of at least two predetermined time delays in pulses transmitted from said second station to said first station via said common transmission path so that pulses transmitted to said first station have one of at least two preselected phase relationships with the pulses received by said second station, said means for inserting being operatively connected to an output of the modulator means for transmitting pulses present in said second station; and detector means for detecting the presence of said control signal in the pulses received by said second station, said detector means being operatively connected to an output of the demodulator means present in said second station.

11. The pulse communications system according to claim 10 wherein the improvement additionally comprises switching means responsive to the detection of said control signal by said detector means for changing the delay inserted into the pulses transmitted from the second station to the first station via said common transmission path from one of said at least two predetermined time delays to another of said at least two predetermined time delays, said switching means being interposed between an output of said detector means and said means for inserting one of at least two predetermined time delays.

12. The pulse communications system according to claim 11 wherein the improvement additionally comprises:

first timing means present in said first station for controlling the operation of the transmitter means therein by the application of first timing pulses thereto;

second timing means present in said first station for controlling the operation of the demodulator means therein by the application of second timing pulses thereto, said second timing means acting to derive timing information from pulses received by said first station and producing said second timing pulses in response thereto; and means for applying the first and second timing pulses produced by said first and second timing means to individual inputs of said means for detecting any coincident phase relationship between pulses transmitted from and received by said first station.

13. The pulse communications system according to claim 12 wherein said means for detecting any coincident phase relationship between pulses transmitted from and received by said first station comprises coincidence circuit means responsive to the coincident application of said first and second timing signals thereto to produce an output representative of said coincident relationship.

14. The pulse communications system according to claim 13 wherein said coincident circuit means comprises AND gate means.

15. The pulse communications system according to claim 14 wherein said control means acts to generate said control signal in response to an output of said AND gate means, said control means being operatively connected at an output thereof to an input of the modulator means present in said first station whereby such control signal is modulated and transmitted to said second station via said common transmission path.

16. The pulse control communications system according to claim 15 wherein the improvement additionally comprises third timing means present in said second station for extracting timing information from pulses received by said second station and controlling the operation of both the demodulator means and the modulator means present therein.

17. The pulse control communications system according to claim 16 wherein said means present in said second station for inserting one of at least two time delays in pulses transmitted to said first station includes first and second delay means and switch means for selectively deriving the pulses produced by the modulator means present in said second station from one of said first and second delay means.

18. The pulse control communications system according to claim 17 wherein said switching means operatively controls said switch means whereupon the delay means selected is controlled by said switching means.

* * * * *

UNITED STATES PATENT OFFICE
CERTIFICATE OF CORRECTION

Patent No. 3,618,025 Dated November 2, 1971

Inventor(s) Atsushi TOMOZAWA

It is certified that error appears in the above-identified patent and that said Letters Patent are hereby corrected as shown below:

Column 11, line 72, "and relationships in said first station" should be --and present in said first station--;

Column 13, line 7, "of of at least" should be --of at least--.

Signed and sealed this 25th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334